United States Patent
Sakaniwa

(10) Patent No.: US 7,463,888 B2
(45) Date of Patent: Dec. 9, 2008

(54) WIRELESS COMMUNICATION TERMINAL AND A METHOD OF COMMUNICATION USING THE WIRELESS COMMUNICATION TERMINAL

(75) Inventor: Hidenori Sakaniwa, Kawasaki (JP)

(73) Assignee: Casio Hitachi Mobile Communications Co., Ltd., Higashiyamato-Shi, Tokyo (JP)

(*) Notice: Subject to any disclaimer, the term of this patent is extended or adjusted under 35 U.S.C. 154(b) by 2 days.

(21) Appl. No.: 11/159,017

(22) Filed: Jun. 22, 2005

(65) Prior Publication Data

US 2005/0288054 A1    Dec. 29, 2005

(30) Foreign Application Priority Data

Jun. 25, 2004   (JP) ............... 2004-188341
May 26, 2005   (JP) ............... 2005-154191

(51) Int. Cl.
H04Q 7/00    (2006.01)
(52) U.S. Cl. .............. 455/435.2; 455/435.1; 455/435.3; 455/574; 455/134; 455/135
(58) Field of Classification Search .............. 455/435.1, 455/435.2, 435.3, 574, 134, 135
See application file for complete search history.

(56) References Cited

U.S. PATENT DOCUMENTS 6,463,298 B1 * 10/2002 Sorenson et al. .......... 455/552.1

FOREIGN PATENT DOCUMENTS

| JP | 2002-247133 | 8/2002 |
| JP | 2002-325074 | 11/2002 |
| JP | 2004-096394 | 3/2004 |

OTHER PUBLICATIONS

Office Action dated Jun. 12, 2008 issued for the counterpart Japanese Patent Application No. 2005-154191, (2 pgs.).

* cited by examiner

Primary Examiner—Vincent P. Harper
Assistant Examiner—Charles Shedrick
(74) Attorney, Agent, or Firm—Cohen Pontani Lieberman & Pavane LLP

(57) ABSTRACT

A wireless processing section has modulation/demodulation circuits which contain communication protocols used for a plurality of communication systems. A communication control section performs an entering idle state process according to a selected communication mode by a communication processing selection section and executes an entering idle state process by switching communication modes until an entering idle state process is successful. Subsequently, when an entering idle state process is successful, a maximum number of origination retry attempts is determined corresponding to a required time interval until completion of that entering idle state process. Specifically, the maximum number of origination retry attempts is decreased to the extent that the time interval until an entering idle state process completion becomes longer. The communication control section performs retries fore only the determined maximum number of origination retry count attempts when connection failed in an origination process.

16 Claims, 10 Drawing Sheets

FIG. 2

| PREFERRED ORDER | COMMUNICATION MODE |
|---|---|
| 1 | CDMA |
| 2 | TDMA |
| 3 | WIRELESS LAN |
| ⋮ | ⋮ |

| FUNCTIONS (APPLICATIONS) | COMMUNICATION MODES |
|---|---|
| TELEPHONE | CDMA1x |
| E-MAIL | 1xEV-DO |
| WEB | 1xEV-DO |
| ⋮ | ⋮ |

| PREFERRED ORDER | COMMUNICATION MODE | RETRY COUNT |
|---|---|---|
| 1 | CDMA | n1 |
| 2 | TDMA | n2 |
| 3 | WIRELESS LAN | n3 |
| ⋮ | ⋮ | ⋮ |

EXAMPLE: CASE OF n3 > n1, n2

| PREFERRED ORDER | COMMUNICATION MODE | RETRY COUNT | |
|---|---|---|---|
| 1 | WIRELESS LAN | n3 | ⎫ |
| 2 | TDMA | n2 | ⎬ EXCHANGE |
| 3 | CDMA | n1 | ⎭ |
| ⋮ | ⋮ | ⋮ | |

WIRELESS COMMUNICATION TERMINAL AND A METHOD OF COMMUNICATION USING THE WIRELESS COMMUNICATION TERMINAL

CROSS-REFERENCE TO RELATED APPLICATIONS

This application is based upon and claims the benefit of priority from the prior Japanese Patent Application No. 2004-188341, filed Jun. 25, 2004 and Japanese Patent Application No. 2005-154191, filed May 26, 2005, which are entirely incorporated herein by reference.

BACKGROUND OF THE INVENTION

1. Field of the Invention

The present invention relates to a wireless communication terminal and communication method using wireless communication technology represented by cellular telephones and Personal Digital Assistants.

2. Description of the Related Art

Wireless communication systems incorporate various systems, for example, TDMA (Time Division Multiple Access), CDMA (Code Division Multiple Access), W-CDMA (a European version of Wideband CDMA), 1xEV-DO (1x Evolution-Data Optimized), PHS (Personal Handy phone Service), wireless LAN (Local Area Network), UWB (Ultra Wideband), infrared wireless, etc. Furthermore, cellular phone service incorporating a plurality of these wireless communication technologies is evolving at a phenomenal pace. In this case, it is necessary to communicate by selectively switching communication systems (communication modes) according to surrounding radio wave propagation conditions.

As a transmission retry method in cases where a plurality of these wireless communication systems are installed, a technique is known from conventional prior art which selectively switches a plurality of modulation circuits and varies the transmission retry count (synonymous in meaning to the number of times or frequency to retry transmission) of the radio wave (wireless communication electromagnetic wave) depending on the wireless transceiver rate for transmitting data. For example, the subject matter disclosed in Japanese Laid-Open (Kokai) Patent Application No. 2002-247133 titled "WIRELESS COMMUNICATION APPARATUS."

Apart from that, during radio wave reception conditions influenced by noise, interference, attenuation, etc., a transmitted radio wave from a terminal has difficulty reaching a network and similarly a response from a network has difficulty reaching a terminal. In this case, after shifting to an idle state, a transmission operation is also performed prior to data transmission and reception. In the event there is no response from a network for a communication transmission because of poor radio wave conditions, transmission retries are executed in order to establish a line connection.

However, the technology disclosed in the above-mentioned conventional prior art reference with installed terminal modulation circuits consisting of different wireless transmission speeds is a technique for varying the transmission retry count relative to the transmission error rate after connection completion and restated corresponds to a selected wireless transmission speed (=communication system). Consequently, this technology does not vary the transmission retry count in a transmission operation performed prior to data transmission and reception. Therefore, the conventional prior art has a disadvantage because the transmission retry count at the time of a transmission operation is fixed. In an environment where radio wave reception conditions are under the influence of noise, interference, attenuation, etc., the process for establishing a connection requires a longer time interval (time period) and furthermore, since radio wave output continues, excessive electrical power is expended during this period.

SUMMARY OF THE INVENTION

The present invention solves the above-mentioned drawbacks. Specifically, the present invention can connect as rapidly as possible with an available communication network and aims at providing a wireless communication terminal and communication method which significantly reduces power consumption.

In compliance with the present invention, a wireless communication terminal for achieving the above-described object comprises a communication means for communicating; a communication status acquisition means for acquiring a communication status by the communication means; and a determination means for determining a maximum number of origination retry count attempts to establish a connection when a failure condition occurs during an origination operation by the communication means, wherein the maximum number is related to a communication status acquired by the communication status acquisition means.

In the wireless communication terminal according to the present invention, the determination means decreases the maximum number of origination retry count attempts to the extent that the indicated time interval required until establishing a line connection is longer based on a communication status acquired by the communication status acquisition means.

The wireless communication terminal according to the present invention, further comprises a time measurement means for measuring an entering idle state period until an entering idle state operation completion by the communication means; and the determination means determines the maximum number of origination retry count attempts by the communication means based on a measured entering idle state period by the time measurement means.

In the wireless communication terminal according to the present invention, the determination means decreases the maximum number of origination retry count attempts so that a measured entering idle state period by the time measurement means is longer.

In the wireless communication terminal according to the present invention, the determination means determines the maximum number of origination retry count attempts for communication modes selected within a range of all the maximum number of origination retry count attempts set in advance.

A wireless communication terminal according to the present invention for selectively switches a plurality of communication modes used for communication comprises a communication mode memory means for registering a plurality of communication modes; a communication mode selection means for selecting a communication mode used for communication in a predetermined sequence from among a plurality of communication modes registered in the communication mode memory means; an entering idle state operation execution means for executing an entering idle state operation in a communication mode selected by the communication mode selection means; a switching means for switching a communication mode selected by the communication mode selection means in the event of an entering idle state operation failure by the entering idle state operation execution means; a time measurement means for measuring an entering idle state period until an entering idle state operation in a selected communication mode is completed when an entering idle state operation according to the entering idle state operation execution means is successful; a determination means for determining a maximum number of origination retry count attempts of a relevant communication mode based on a measured entering idle state period by the time measurement means; and an origination operation execution means for executing origination retries only for the maximum number of origination retry count attempts determined by the determination means when unable to establish a connection while performing an origination operation using a selected communication mode.

In the wireless communication terminal according to the present invention, the communication mode switching means judges that an entering idle state operation failed when an entering idle state period until completion of an entering idle state operation by the entering idle state operation execution means exceeds a predetermined threshold value.

In the wireless communication terminal according to the present invention, the determination means decreases the maximum number of origination retry count attempts so that a measured entering idle state period by the time measurement means is longer.

In the wireless communication terminal according to the present invention, the determination means determines the maximum number of origination retry count attempts for communication modes selected within a range of all the maximum number of origination retry count attempts set in advance.

The wireless communication terminal according to the present invention, further comprises a communication mode specification means for specifying a communication mode used for communication from among a plurality of communication modes registered in the communication mode memory means; and the communication mode selection means selects a specified communication mode by the communication mode specification means as a communication mode used for communication.

The wireless communication terminal according to the present invention further comprises a function indication means for indicating communication classification; and the communication mode selection means selects a communication mode corresponding to a communication classification by the function indication means as a communication mode used for communication.

A communication method according to the present invention for performing communication in a predetermined communication mode comprises the steps of acquiring a communication status prior to an origination operation; determining a maximum number of origination retry count attempts to establish a connection based on that communication status; and performing transmission retries only for the maximum number of origination retry count attempts when a connection fails while performing an origination operation.

In the communication method according to the present invention, the maximum number of origination retry counts attempts is the acquired communication status which constitutes a smaller value which indicates a required time interval until establishing a line connection is longer.

In the communication method according to the present invention, an entering idle state period is measured until an entering idle state operation completion and the maximum number of origination retry count attempts is determined based on that measured entering idle state period.

In the communication method according to the present invention, the maximum number of origination retry count attempts constitutes a smaller value to the extent that the measured entering idle state period is longer.

In the communication method according to the present invention, the maximum number of origination retry count attempts is calculated within a range of all the maximum number of origination retry count attempts set in advance.

A communication method according to the present invention for performing communication by selectively switching a plurality of communication modes used for communication comprises the steps of selecting a communication mode used for communication in a predetermined sequence from among a plurality of communication modes; executing an entering idle state operation in that selected communication mode; switching a communication mode and executing an entering idle state operation again when that entering idle state operation failed; measuring an entering idle state period until completion of an entering idle state operation in a selected communication mode when that entering idle state operation is successful; determining a maximum number of origination retry count attempts of a relevant communication mode based on that measured entering idle state period; and performing origination retries only for the maximum number of origination retry count attempts when a connection fails while performing an origination operation using a selected communication mode.

The communication method according to the present invention, further includes the step of judging that an entering idle state operation failed and switches communication modes when an entering idle state period until the entering idle state operation completion exceeds a predetermined threshold value.

In the communication method according to the present invention, the maximum number of origination retry count attempts constitutes a smaller value to the extent that the measured entering idle state period is longer.

In the communication method according to the present invention, the maximum number of origination retry count attempts is calculated within a range of all the maximum number of origination retry count attempts set in advance.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a conceptual diagram for explaining the retention status of transmission communication modes in the first embodiment;

DETAILED DESCRIPTION OF THE PREFERRED EMBODIMENTS

Hereinafter, the preferred embodiments of the present invention will be described in detail with reference to the drawings. Additionally, even though reference is made concerning favorable (good) and unfavorable (poor) communication conditions (or radio wave conditions) later in the description, the suitability of these communication conditions (or radio wave conditions) is judged by the comparative length of a time interval required until establishing a connection with a wireless base station.

A. First Embodiment

A-1. Configuration of the First Embodiment

Figure 1:
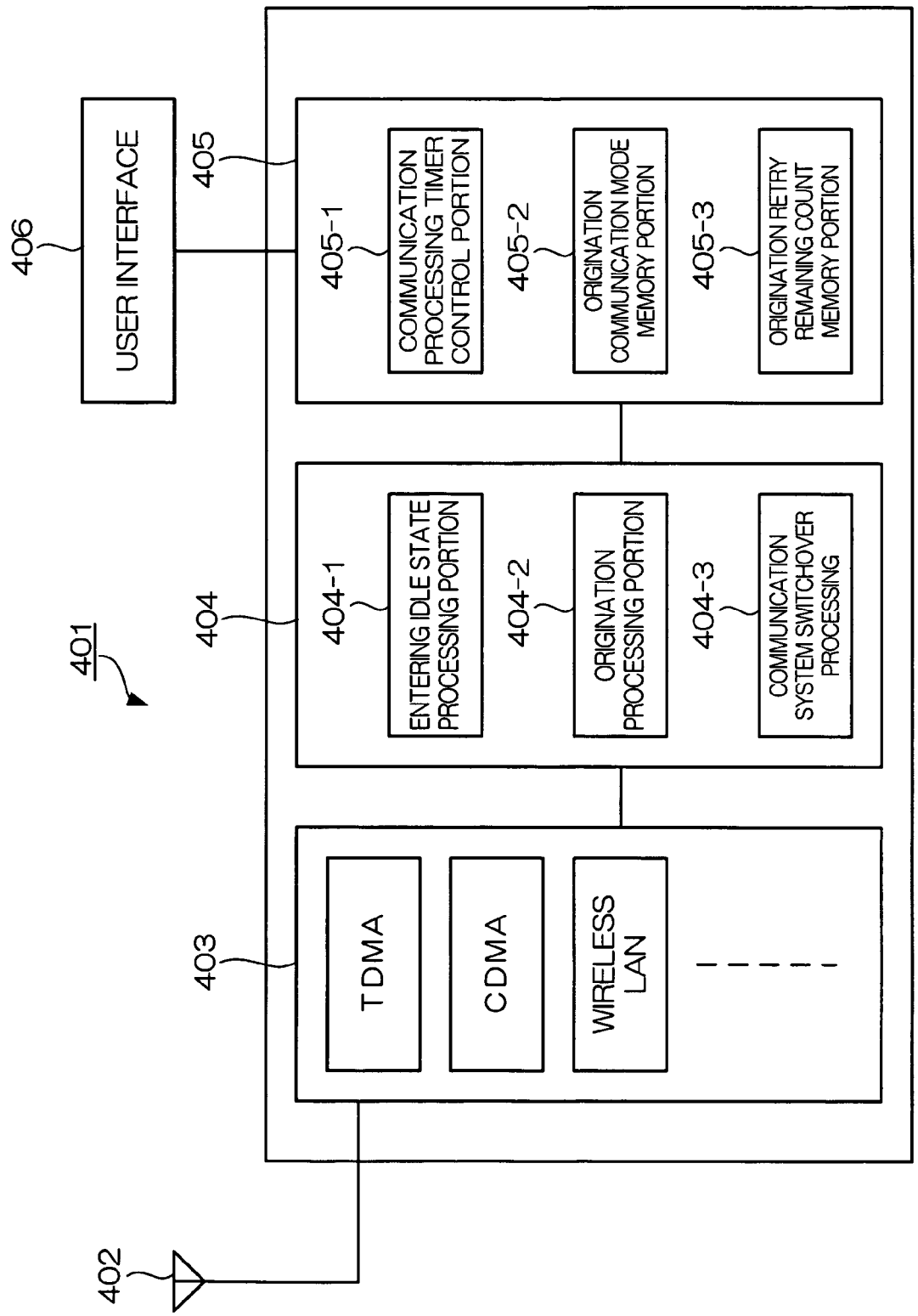
FIG. 1 is a block diagram showing the configuration of the wireless communication terminal in the first embodiment of the present invention.

FIG. 1 is a block diagram showing the configuration of the wireless communication terminal in the first embodiment of the present invention.

FIG. 2 is a conceptual diagram for explaining the retention status of origination communication modes in the first embodiment.

Initially, as seen in FIG. 1, a communication terminal 401 is installed with a plurality of communication systems and comprises essential functions for the present invention. A transmitting and receiving antenna 402 is used by the communication terminal 401 for communication. A wireless processing section 403 is a circuit component with modulation/demodulation circuits which contain communication protocols used for the installed plurality of communication systems. For example, TDMA, CDMA, wireless LAN, etc. modulation/demodulation circuits and communication protocols are installed.

The communication terminal 401 employs wireless technology represented by cellular phones and Personal Digital Assistants which connects with wireless base stations located at various places. Accordingly, the communication terminal 401 can connect to communication networks and other terminals for effecting voice communication and data communication. Among communication systems, there are various modes employed, such as TDMA, CDMA, W-CDMA, 1xEV-DO, PHS, wireless LAN, UWB, infrared wireless, etc. Cellular phone service has also expanded by having a plurality of these wireless communication systems installed. In this case, it is necessary to communicate by selectively switching communication modes according to the surrounding radio wave propagation conditions. Therefore, in cases which will not result in an idle state for establishing communication within a predetermined time interval, sequentially the communication mode is switched to another communication mode.

A communication control section 404 controls the wireless processing section 403 and is a circuit component which performs communication control and follows the communication system selected by a communication processing selection section 405 described later. The wireless processing section 403 is controlled and includes the functions for performing an entering idle state process, for performing an origination process and for switching communication. The communication control section 404 comprises an entering idle state processing portion 404-1, an origination processing portion 404-2 and a communication system switchover processing portion 404-3 in order to execute these functions.

The entering idle state processing portion 404-1 executes an entering idle state process until shifting to an idle state for performing transmission and reception of a call from a base station. The origination processing portion 404-2 executes an origination process for establishing a data channel connection between base stations so that voice communication and data communication can be performed. The communication system switchover processing portion 404-3 executes a switchover process to another communication mode when an entering idle state process fails.

The communication processing selection section 405 is a circuit component which selects communication processing according to directions from a user interface 406. This communication processing selection section 405 receives a communication commencement request from the user interface 406, which starts an origination timer operation and an idle state timer operation. The communication modes memorized are sequentially switched whenever an entering idle state process in the communication control section 404 is unsuccessful. Included is a function for calculating an origination retry count and an origination retry remaining count (remaining number of times to retry transmission) according to the idle state of that communication system. The communication processing selection section 405 comprises a communication processing timer control portion 405-1, an origination communication mode memory portion 405-2 and an origination retry remaining count memory portion 405-3 in order to execute these functions.

Here, an origination retry count represents the number of times an origination operation is repeatedly attempted to establish a connection when a failure condition occurs during an origination operation. In conventional prior art, a transmission retry count (synonymous in terminology only to "origination retry count") is fixed. In comparison with the present invention, an origination retry count attempts in the switched communication mode, namely, the maximum number of origination retry count attempts, is determined according to the idle state time interval in that communication mode. In other words, instead of the conventional prior art which uses a fixed "count-based" retry number of attempts, the present invention employs a "time-based" retry number of attempts.

The communication processing timer control portion 405-1 controls an origination timer operation which clocks time related to an idle state process as well as an origination timer operation which clocks the total time included in an entering idle state process and an origination process. The origination communication mode memory portion 405-2, as illustrated in FIG. 2, retains a predetermined sequence (preferred order) of the communication systems utilized in the communication switching process related to the present invention. When preset in a terminal or set up by a user, the communication systems of this registered sequence acquire positional information, such as GPS (Global Positioning System), etc., by way of the terminal measuring and automatically configuring the receiving radio wave field strength.

Thus, a case where set up is established from that positional information can be considered. The example shown in FIG. 2 is set in preferred order of the communication modes. In cases which will not result in an idle state for establishing communication within a predetermined time interval, the communication mode is switched sequentially according to the preferred order. In the FIG. 2 example, the preferred order is set in a sequence of CDMA, TDMA, wireless LAN, . . . .

The origination retry remaining count memory portion 405-3 retains the available origination retry remaining count for a plurality of installed communication systems.

The user interface 406 comprises a main display and a key input portion, which are used by a user to generate terminal commands for changing a preset value.

Furthermore, in FIG. 1, only the principal sections for a wireless communication terminal configuration relative to the present invention are illustrated. Naturally, when the communication terminal is a cellular phone, the apparatus is supplemented with an essential microphone for voice communication, receiver, audio CODEC, etc.

A-2. Operation of the First Embodiment

Next, the operation of the first embodiment mentioned above will be explained.

(a) Entering Idle State Process and Origination Process

Figure 3:
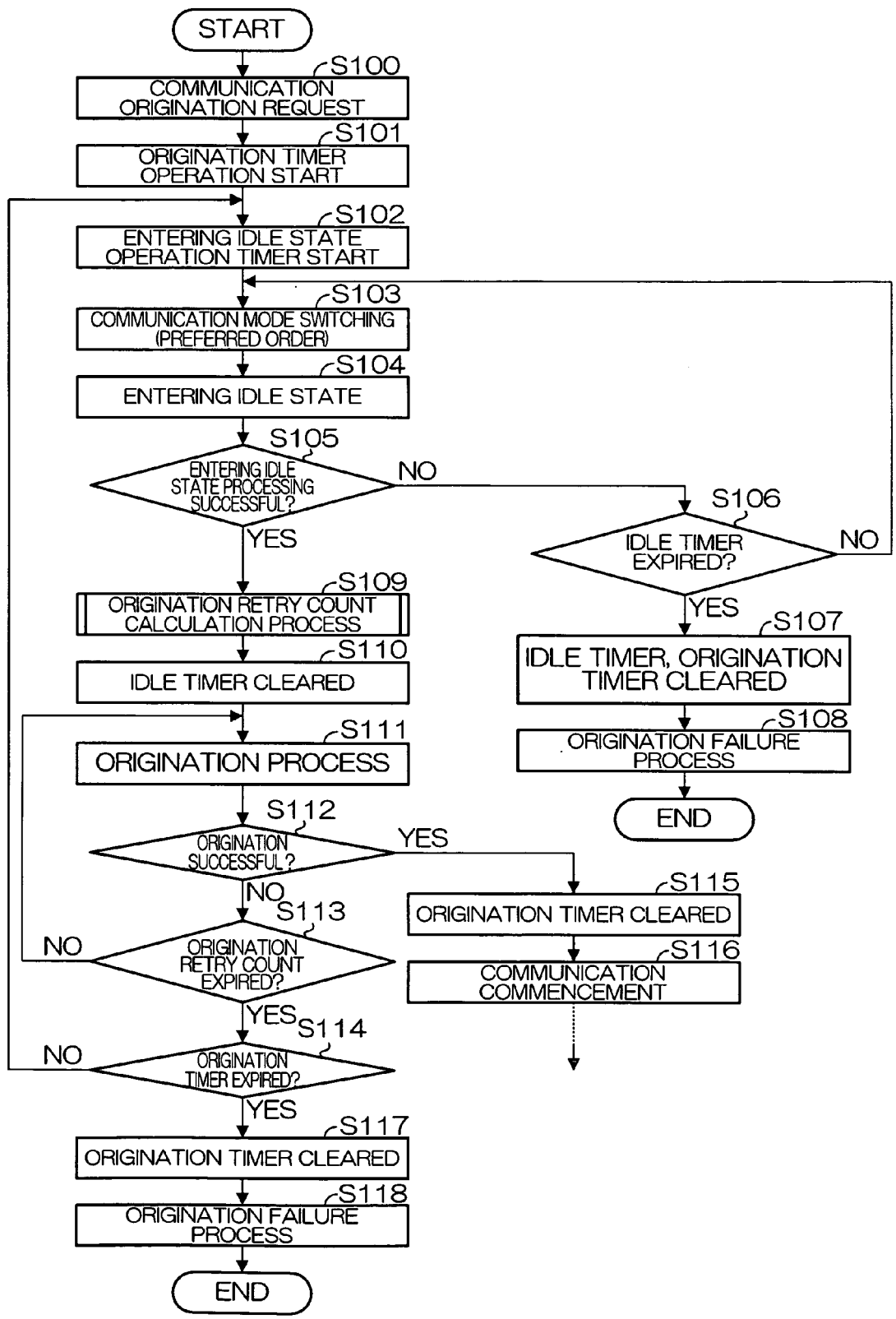
FIG. 3 is a flow chart for explaining operation of the wireless communication terminal 401 in the first embodiment.

FIG. 3 is a flowchart for explaining operation of the wireless communication terminal 401 in the first embodiment.

Figure 4:
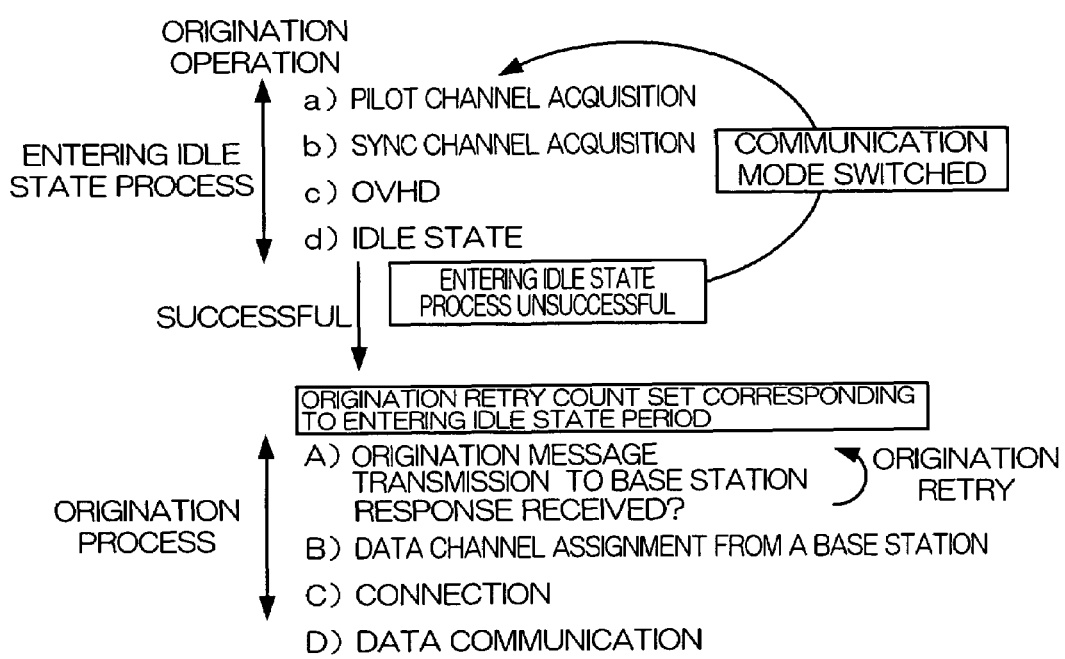
FIG. 4 is a conceptual diagram for explaining an entering idle state process and an origination process in the first embodiment.

FIG. 4 is a conceptual diagram for explaining an entering idle state process and an origination process in the first embodiment.

When a communication commencement request (origination operation: voice transmission or data communication transmission) is generated from a user via the user interface 406 (Step S100), an origination timer operation is started (Step S101). When radio wave reception conditions are poor due to the influence of noise, interference, attenuation, etc. and the user has to transmit via a connection with a wireless base station for an extended period of time, power supply consumption becomes excessive and also subsequent connection becomes impossible in many cases. Accordingly, the origination timer operation is started in order to prevent such a situation.

Next, as the terminal connects to or "acquires" a radio wave, an idle state timer is started for clocking the time interval to shift to an idle state which can be shifted to an origination operation (Step S102). The communication mode is switched according to the preferred order of the origination communication mode memory portion shown in FIG. 2 (Step S103). Initially, the communication mode ranked highest in the preferred order is selected. Furthermore, upon switching the communication mode in Step S103, an entering idle state period measurement timer is started for measuring the suspend time interval until an entering idle state completion after switching communication modes. Subsequently, an entering idle state process which acquires a radio wave with the selected communication mode is executed (Step S104). An entering idle state process is illustrated in FIG. 4. First, a) where a pilot channel or pilot signal acquisition ("PILOT CHANNEL ACQUISITION") is performed and the pilot channel acquired; secondly, b) where a synchronous channel acquisition ("SYNC CHANNEL ACQUISITION") is performed and the synchronous channel acquired; and next, c) overhead data ("OVHD") acquisition in a paging channel is performed and a setting change of the parameters for receiving (monitoring) the paging channel based on the acquired overhead data is prepared. Accordingly, d) an "IDLE STATE" which is able to receive call and informational data is established.

At this stage, after radio wave acquisition is successful with the selected communication mode, the operation judges whether or not processing has been shifted to an idle state (Step S105). Then, when unable to shift to an idle state, a further check is performed to determine whether or not the idle state timer has expired (Step S106). Here, when the idle state timer has not expired, the operation reverts to Step S103 which switches to the next communication mode according to the preferred order and confirms again whether or not it is able to shift to an idle state. Hereinafter, when unable to shift to an idle state, the idle state process is repeated by switching communication modes until the idle state timer expires.

Then, when the idle state timer expires which signifies an entering idle state process is unsuccessful, the origination timer and the idle state timer are cleared (Step S107). Further, an origination failure process is performed to display, etc. the origination failure (Step S108) and origination is concluded.

Meanwhile, when a shift to an idle state is successful in any communication mode, an origination retry count calculation process is executed (Step S109). An origination retry count calculation process follows the time interval required until shifting to an idle state in a communication mode and in which that shift to an idle state was successful. Namely, an origination retry count is calculated in an origination process for the selected communication mode according to the time interval measured by the entering idle state measurement timer. In an origination retry calculation process, when an entering idle state period is brief, radio wave conditions are deemed favorable (good) and the origination retry count in the selected communication mode is increased. Conversely, when an entering idle state period is lengthy, radio wave conditions are deemed unfavorable (poor) and the origination retry calculation count in that communication mode is decreased.

Furthermore, as for the origination process described in the first embodiment, when an origination is unsuccessful due to poor radio wave conditions, etc., only the origination retry count (the number of times to retry transmission) calculated at that stage can be used to retry an origination process. Thus, in cases where an origination is unsuccessful even if only retried by that origination retry count, the communication mode is switched and executed again from an entering idle state process. Briefly, whenever a communication mode is switched, an origination retry count is calculated in that communication mode.

However, in cases where many communication modes are switched, the total of the origination retry count will increase until a successful origination and the user will be kept waiting.

Therefore, in the first embodiment a limitation is set for the total of the origination retry count. Specifically, an available origination retry count is stored as the origination retry remaining count and a method is employed which distributes an origination retry count for every communication mode based on this origination retry remaining count. Concerning this origination retry count calculation, the origination failure cause in the preceding origination process can be used. Also, the details of the origination retry count calculation process containing the above-mentioned origination retry remaining count are described later.

When an origination retry count is calculated and since already in an idle state, the idle state timer will be cleared at this stage (Step S110). Next, the selected communication mode performs an origination process (Step S111). Subsequently, the operation judges whether or not the origination process is successful (Step S112). In cases where the origination process is successful, the origination timer is cleared (Step S115) and communication is commenced (Step S116).

Specifically, in an origination process as seen in FIG. 4, first, A) an "ORIGINATION MESSAGE" is transmitted to a wireless base station and there is a response (acknowledgement) from that wireless base station; secondly, B) wait for data channel assignment from a wireless base station; and next, C) "CONNECTION" is accomplished in the allocated channel. Accordingly, this will constitute a status in which D) "DATA COMMUNICATION" can be performed. Furthermore, in this embodiment the operation judges the successfulness of the above-mentioned origination process by verifying the presence of a transmission response from that base station for the "ORIGINATION MESSAGE." Moreover, the timing for transmitting communicative distant end data can be sent at any time prior to commencing data communication. The timing for transmitting communicative distant end data is usually prescribed by each communication system. Further, a system which transmits communicative distant end data as a part of the "ORIGINATION MESSAGE" and a system which transmits communicative distant end data to a connected data channel exist. Accordingly, what is necessary is just to transmit the communicative distant end data according to the timing specified by each system.

Meanwhile, in cases where an origination process is unsuccessful, an operation judges whether or not an origination retry count has expired (Step S113). If not expired, the operation reverts to Step S111 and an origination process is performed again. Specifically, as seen in FIG. 4, the origination process of A) "ORIGINATION MESSAGE" transmission to a base station is repeated. Also, even if an origination retry count has expired which signifies an origination process is unsuccessful, the operation judges whether or not the origination timer has expired (Step S114). If not expired, the operation reverts to Step S102. While restarting the idle state timer, at Step S103 the communication mode is switched and a repeat operation from the entering idle state process mentioned above is executed.

Besides, in cases where an origination process is unsuccessful with the origination retry count and the origination timer being expired, the origination timer is cleared (Step S117). Further, an origination failure process is performed to display, etc. the origination failure (Step S118).

(b) Origination Retry Count Calculation Process

Figure 5:
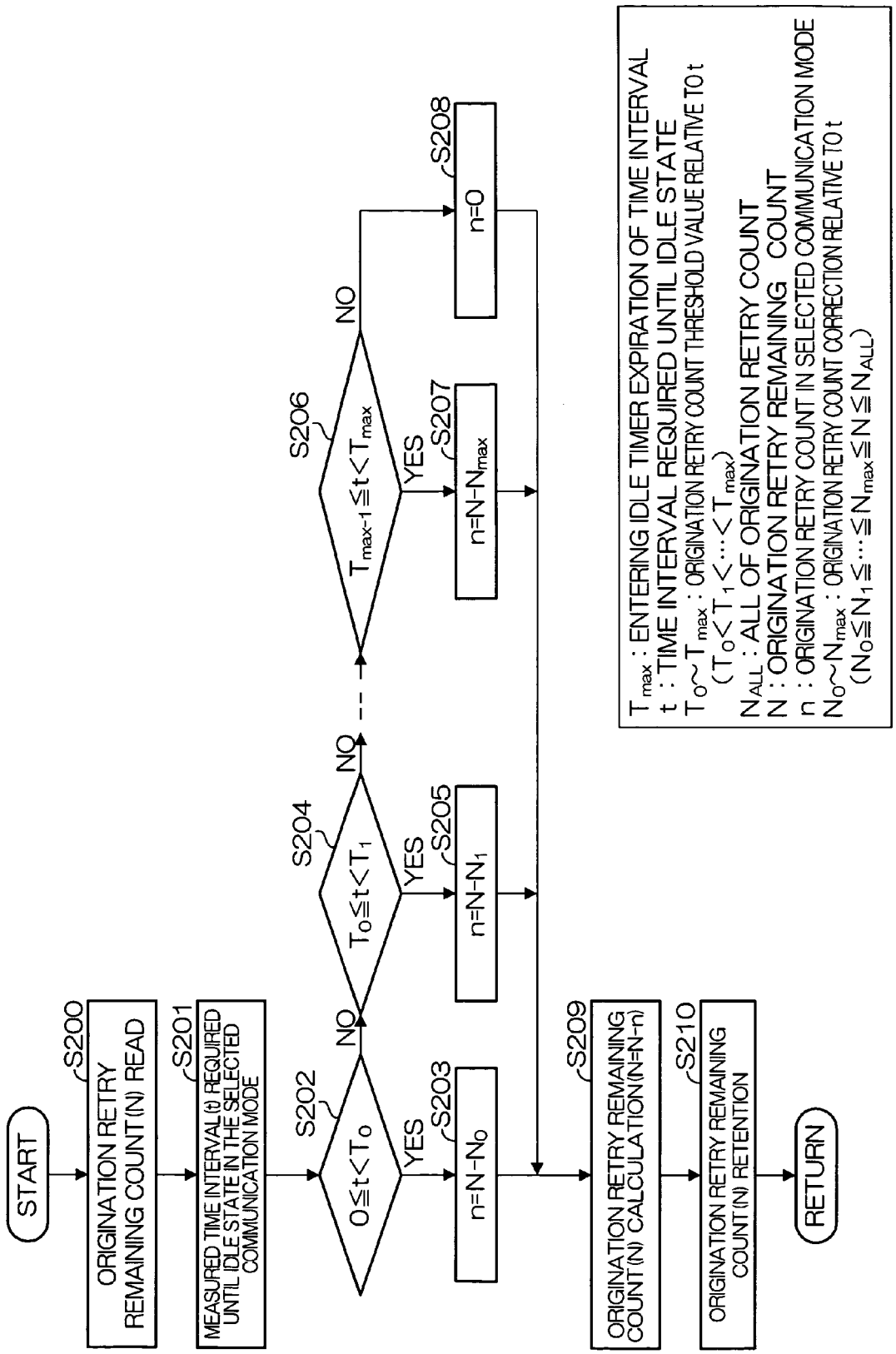
FIG. 5 is a flow chart for explaining the origination retry count calculation process in the first embodiment.

FIG. 5 is a flow chart for explaining the origination retry count calculation process in the first embodiment.

Initially, the origination retry remaining count N which can be used for retries in the currently selected communication mode is read-in from the origination retry remaining count memory portion 405-3 memory (Step S200). The initial values of all the regular origination retry count $N_{ALL}$ are set as the origination retry remaining count N.

Next, the measured time of the entering idle state period measurement timer that functions at the time of communication mode switching in Step S103 is read. Specifically, this relates to the time interval t (time period of a) ~d) in FIG. 4) required until shifting to an idle state in a selected communication mode (Step S201).

Next, an origination retry count n (number of times to retry transmission) in the selected communication mode is calculated according to an origination retry count correction value $N_0$-$N_{MAX}$ (provided that $N_0 \leq N_1 \leq \ldots \leq N_{MAX} \leq N_{ALL}$) corresponding to the above-mentioned time interval t, a time interval threshold value $T_0$-$T_{max}$ (provided that $T_0 < T_1 < \ldots < T_{max}$) for setting the origination retry count, the origination retry remaining count N and a time interval threshold value $T_0$-$T_{max}$ (Steps S202-S208). For example, in cases where the time interval t required until transitioning to an idle state in a selected communication mode is $0 \leq t < T_0$ (Step S202), the origination retry count in the selected communication mode is calculated from the origination retry remaining count N and set to a correction value $N_0$ which becomes n=N-$N_0$. Provided that $N_0 \leq N_1 \leq \ldots \leq N_{MAX} \leq N \leq N_{ALL}$ are set, the origination retry count n becomes higher as the time interval t becomes shorter.

In addition, it is preferable to consider setting the origination retry count correction value $N_0$~$N_{max}$ not only relative to the time interval t but also to radio wave field strength. In this regard, let's assume that communication conditions are effective when radio wave field strength is strong as generally compared to when radio field strength is weak. Even if the time interval t required until transitioning to an idle state in a selected communication mode is identical, it is preferable to consider that when the radio wave field strength is strong to set the origination retry count correction value to a smaller quantity and the origination retry count to a greater number of times. Conversely, it is preferable that when the radio wave field strength is weak to set the origination retry count correction value to a larger quantity and the origination retry count to a smaller number of times. Furthermore, as for radio wave field strength, it is possible to use a Reception Signal Strength Indication (RSSI) display signal, pilot parameters Ec/Io (primary and secondary synchronization channels Ec/Io) for showing energy intensity, a carrier pair interference noise power ratio (Carrier to Interference Ratio—C/I), etc.

Moreover, although wireless communication terminals, for example, cellular phones and Personal Digital Assistants can be used anywhere, people also use a wireless communication terminal only at a specific location, such as at home or their work office. When using a wireless communication terminal only at a specific location, there are fewer temporal changes in the communication environment of each communication mode. Accordingly, in such a utilization status, it is also preferable to set the failure cause, etc. at the time of the last origination retry in consideration of the origination retry count correction value $N_0$~$N_{max}$. For example, when there is a connection failure caused by being unable to establish a connection even though the time interval t is brief, it is preferable to increase the origination retry count correction value and to decrease the origination retry count. Also, when the time interval t is lengthy in spite of favorable radio wave field strength and because this can be considered an overreach (excessive), it is preferable to set the origination retry count correction value so as to decrease the origination retry count. Thus, an origination retry count in a communication mode which in the past resulted in a connection failure and an origination retry count in a communication mode with a high possibility of constituting the above-mentioned overreach can be significantly reduced. Consequently, while being able to curtail wasteful power consumption, this technique also makes it possible to elevate the connection rate. Moreover, these techniques are only effective methods when a wireless communication terminal is always used at the same location. Thus, when employing these techniques, it is preferable to have a configuration which sets a mode that can be switched and set whether or not the failure cause, etc. at the time of the last origination retry effects the setting of the origination retry count correction value in a wireless communication terminal and which only has an effect when the selected mode is effected by the user.

Subsequently, the origination retry remaining count N is calculated (Step S209). The origination retry remaining count N which can be calculated with the value (N−n) lengthens (extends) the origination retry count in the communication mode calculated at Steps S202-S208 from the origination retry remaining count N read-in at Step S200. Then, the origination retry remaining count N calculated for retries of the next selected communication mode at Step S103 is saved in the origination retry remaining count memory portion 405-3 (Step S210).

Based on the first embodiment described above, when a time interval takes longer than required in an idle state operation of a selected communication mode, the operation judges that radio wave conditions are unfavorable. Consequently, the origination retry count is increased to the extent that the required time interval in an idle state operation of that selected communication mode is shortened. Because an origination operation in that communication mode is terminated or the retry operation count is decreased, while being able to improve the connection rate corresponding to radio wave conditions, it also becomes possible to control wasteful power consumption by being able to limit the time interval until establishing a connection.

B. Second Embodiment

Next, the second embodiment of the present invention will be explained. In the above-mentioned first embodiment, there is a sequence of processes from an entering idle state process to an origination process. In this second embodiment, a case will be explained where an origination process is executed as an event performed by a user's origination operation after being displayed as an idle state screen display (default window) by the entering idle state process to a default window view. Also, explanation is omitted concerning the configuration of a wireless communication terminal similar to FIG. 1.

B-1. Configuration of the Second Embodiment (a) Entering Idle State Process

Figure 6:
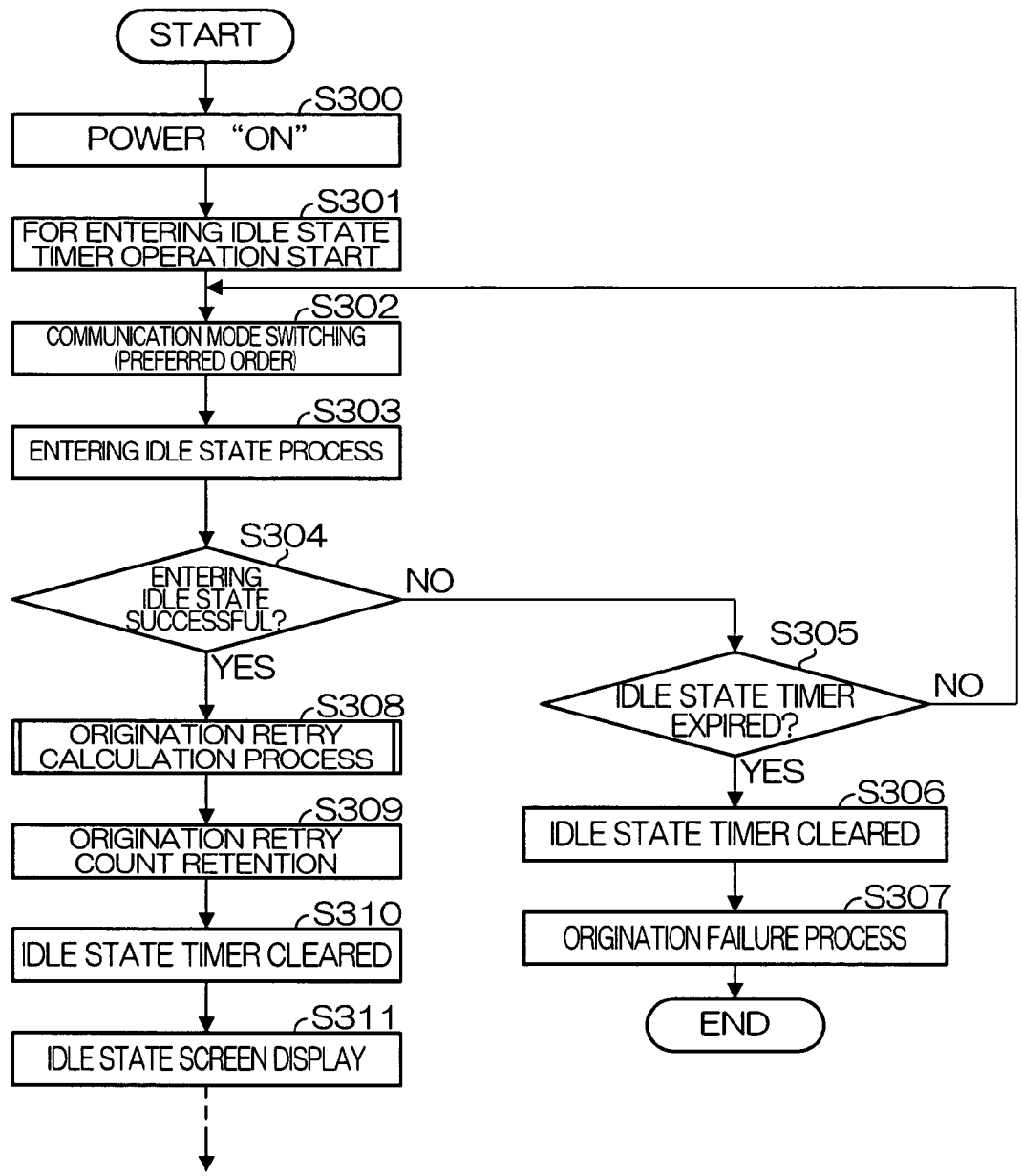
FIG. 6 is a flowchart for explaining operation of the entering idle state process in the second embodiment of the present invention.

FIG. 6 is a flowchart for explaining operation of the entering idle state process in the second embodiment of the present invention.

When a user turns "ON" the power supply via the user interface 406 (Step S300), an idle state timer is started (Step S301) and the communication mode is switched according to the preferred order of the origination communication mode memory portion 405-2 shown in FIG. 2 (Step S302). At this stage, an entering idle state period measurement timer is also started. Subsequently, an entering idle state process which acquires a radio wave with the selected communication mode is executed (Step S303).

Next, after successfully acquiring the radio wave in the selected communication mode, the operation judges whether or not processing has been shifted to an idle state (Step S304). Then, when unable to shift to an idle state, a further check is performed to determine whether or not the idle state timer has expired (Step S305). Here, when the idle state timer has not expired, the operation reverts to Step S302 which switches to the next communication mode according to the preferred order and confirms again whether or not it is able to shift to an idle state. Hereinafter, when unable to shift to an idle state, an entering idle state process is repeated by switching communication modes until the idle state timer expires.

Then, when the idle state timer expires which signifies an entering idle state process is unsuccessful, the idle state timer is cleared (Step S306). Further, an idle state failure process is performed to display that a radio wave is unreceivable (Step S307) and the relevant process is concluded.

Meanwhile, when a shift to an idle state is successful in any communication mode, an origination retry count calculation process is executed (Step S308). This origination retry count calculation process is the same as that of the first embodiment mentioned above. In an origination retry calculation process, when an entering idle state period is brief, radio wave conditions are deemed favorable (good) and the origination retry count in the selected communication mode is increased. Conversely, when an entering idle state period is lengthy, radio wave conditions are deemed unfavorable (poor) and the origination retry calculation count in that communication mode is decreased.

Next, the origination retry count is saved (Step S309) and the idle state timer is cleared (Step S310). Subsequently, an idle state screen display (default window) is shown (Step S311) and a communication commencement request (origination operation: voice transmission or data communication transmission) is generated by a user in this situation.

(b) Origination Process

Figure 7:
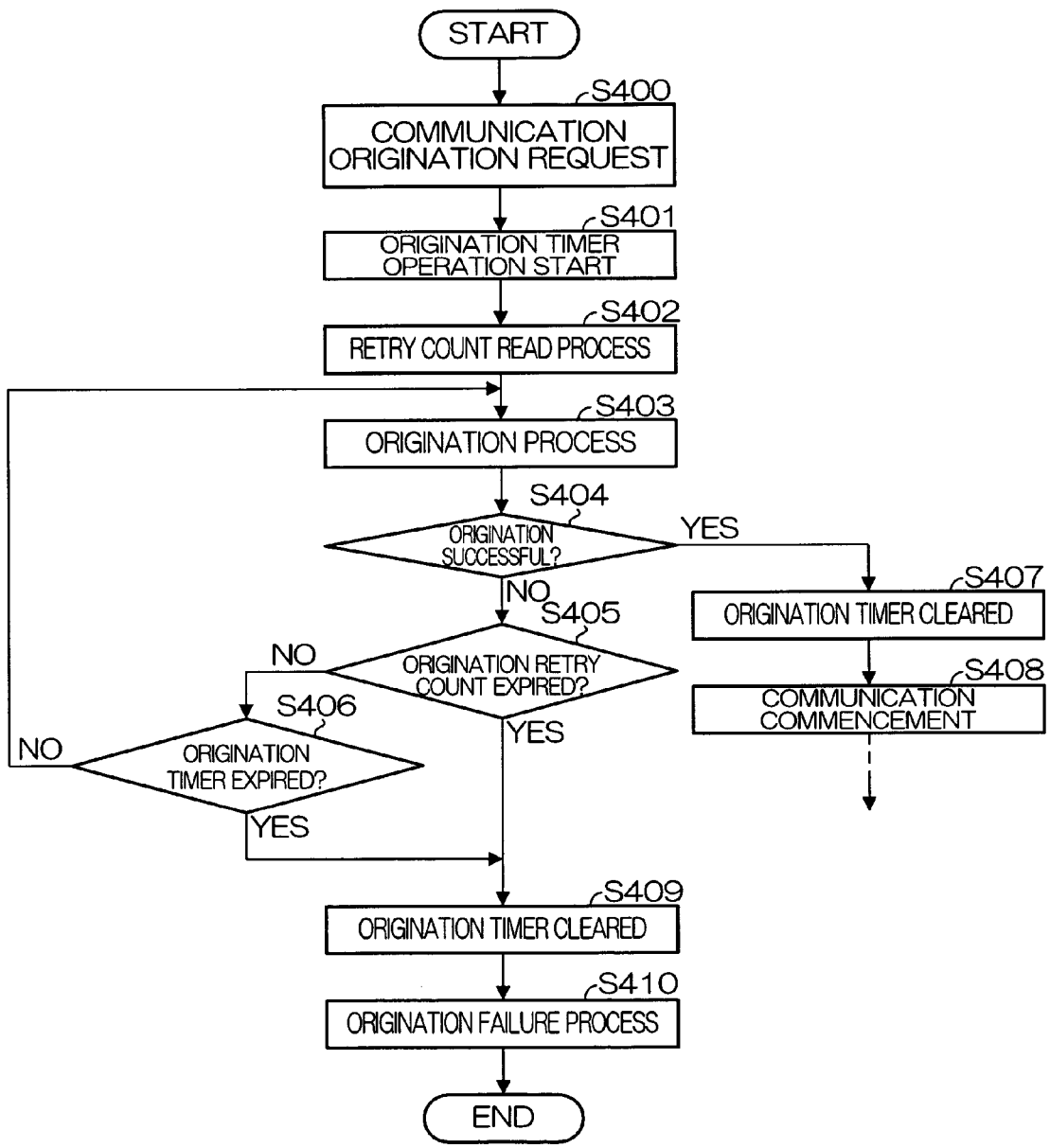
FIG. 7 is a flow chart for explaining operation of the origination process in the second embodiment.

FIG. 7 is a flow chart for explaining operation of the origination process in the second embodiment.

In the default window mentioned above, when a communication commencement request (origination operation: voice transmission or data communication transmission) is generated from a user via the user interface 406 (Step S400), the origination timer operation is started (Step S401). Next, the origination retry count saved by the entering idle state process mentioned above is read (Step S402). Then, the current communication mode selected by the entering idle state process performs an origination process (Step S403).

Subsequently, the operation judges whether or not the origination process is successful (Step S404). When the origination process is successful, the origination timer is cleared (Step S407) and communication commenced (Step S408).

Meanwhile, in cases where an origination process is unsuccessful, an operation judges whether or not an origination retry count has expired (Step S405). If not expired, the operation judges whether or not the origination timer has expired (Step S406). Then, if either the origination retry count or the origination timer has not expired, the operation reverts to Step S403 and a repeat operation of the origination process is executed.

Meanwhile, when an origination process is not successful and either the origination retry count or the origination timer is expired, the origination timer is cleared (Step S409). Further, an origination failure process is performed to display, etc. the origination failure (Step S410) and the relevant process is concluded.

Based on the first embodiment described above, when a time interval takes longer than required in an idle state operation of a selected communication mode, the operation judges that radio wave conditions are unfavorable. Consequently, the origination retry count is increased to the extent that the required time interval in an idle state operation of that selected communication mode is shortened. Because an origination operation in that communication mode is terminated or the retry operation count is decreased, while being able to improve the connection rate corresponding to radio wave conditions, it also becomes possible to control wasteful power consumption by being able to limit the time interval until establishing a connection.

C. Third Embodiment

Next, the third embodiment of the present invention will be explained. The third embodiment enables selection of a communication mode by a user. In an origination operation of a wireless communications terminal, there may be circumstances where the user needs to select a communication mode to compensate for a particular situation intentionally. For example, in an office where a communication service is provided by a wireless LAN, it is a more efficient way for transmission by utilizing an established communication line via a direct wireless LAN rather than attempting other communication modes. In this case, as explained in the embodiment mentioned above, this method does not follow the preferred order of the communication modes currently retained in the origination communication mode memory portion 405-2. It is a more efficient way for the user to select a communication mode preference.

Figure 8:
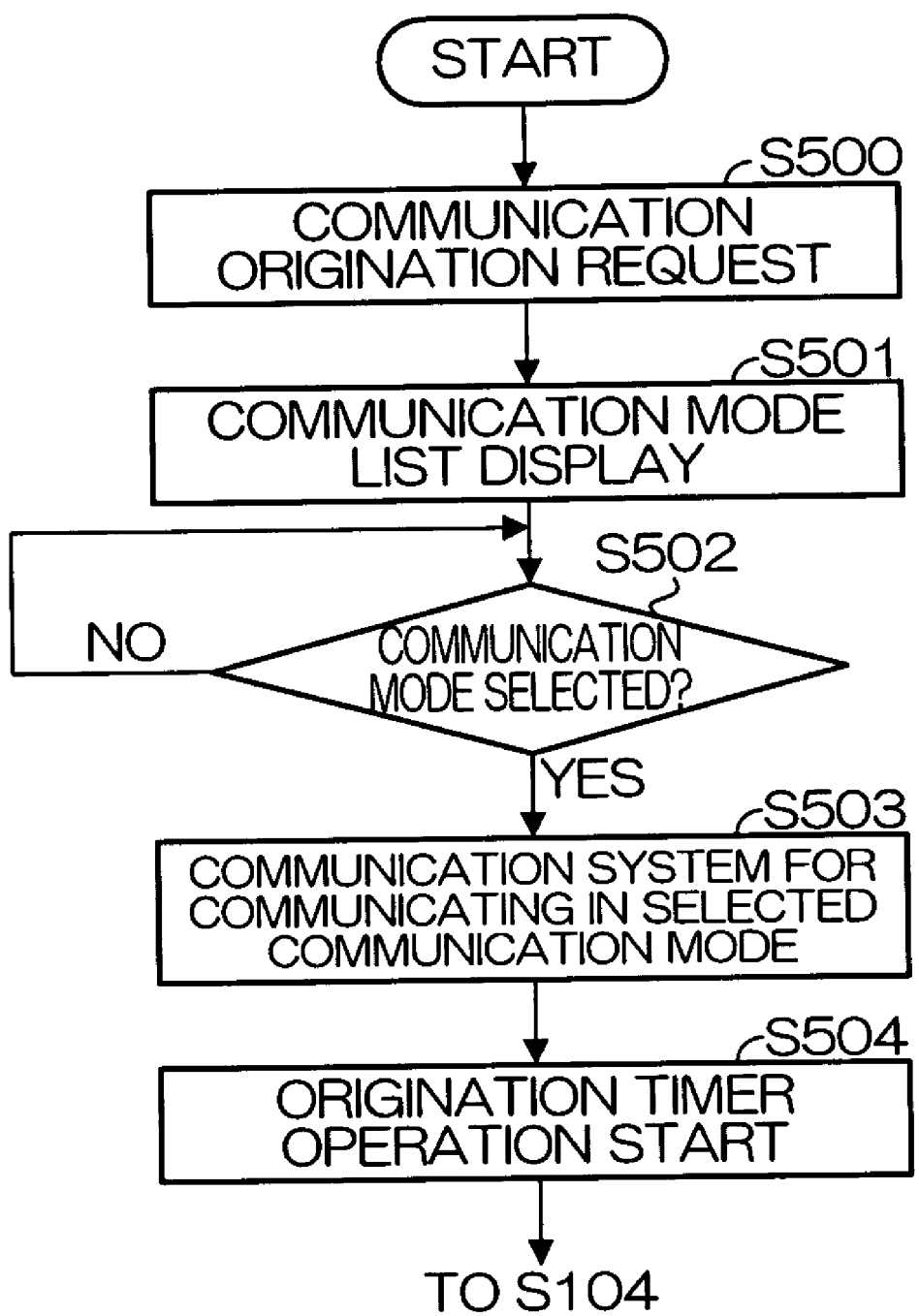
FIG. 8 is a flow chart for explaining the communication mode switching process in the third embodiment.

FIG. 8 is a flow chart for explaining the communication mode switching process in the third embodiment.

Also, the section corresponding to FIG. 3 is omitted.

Initially, when a communication commencement request (origination operation: voice transmission or data communication transmission) is generated from a user via the user interface 406 (Step S500), a listing of a plurality of communication modes retained in the origination communication mode memory portion 405-2 is displayed (Step S501). Next, the operation judges whether or not a communication mode is selected by the user (Step S502). When one of the communication modes is selected from the list display, the operation sets the communication mode as the communication mode used for communication (Step S503). Subsequently, the origination timer operation is started (Step S504). Hereinafter, the operation advances to the entering idle state process of Step S104 and following onward in FIG. 3. Subsequently, an origination retry count calculation process, an origination process, etc. are performed.

Based on the third embodiment mentioned above, since selection of the communication mode to be used is enabled by the user corresponding to the locational circumstances for performing communication, this enhances user-friendliness as being more practicable.

D. Fourth Embodiment

Next, the fourth embodiment of the present invention will be explained.

Figures 9, 10:
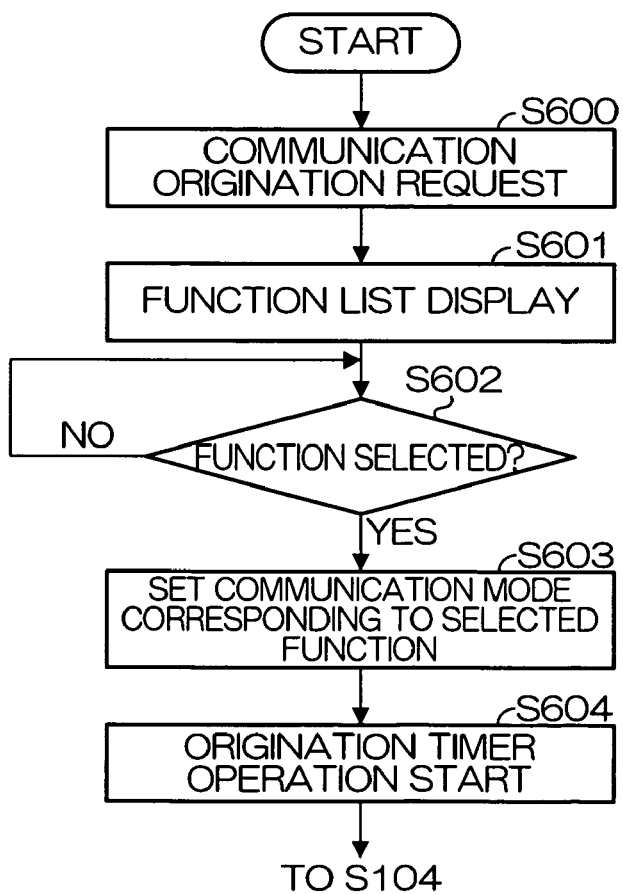
FIG. 9 is a conceptual diagram for explaining the retention status of transmission communication modes in the fourth embodiment.
FIG. 10 is a flow chart for explaining the communication mode switching process in the fourth embodiment.

FIG. 9 is a conceptual diagram for explaining the retention status of origination communication modes in the fourth embodiment.

In the fourth embodiment, the communication mode allocated to each function in advance is selected by a definition corresponding to the function selected by a user, for example, telephone, send and receive E-mail, Internet access (WEB), etc. In the fourth embodiment, as shown in FIG. 9, a communication mode is retained for every function (applications) in the origination communication mode memory portion 405-2.

FIG. 10 is a flow chart for explaining the communication mode switching process in the fourth embodiment.

Initially, when a communication commencement request (origination operation: voice transmission or data communication transmission) is generated from a user via the user interface 406 (Step S600), a listing of the functions (telephone, E-mail, WEB, etc.) which a Personal Digital Assistant provides is displayed (Step S601). Next, the operation judges whether or not one of the functions is selected by the user (Step S602). When one of the functions is selected from the list display, the operation sets the communication mode of the selected function as the communication mode used for communication (Step S603). Subsequently, the origination timer operation is started (Step S604). Hereinafter, the operation advances to the idle state process of Step S104 and following steps in FIG. 3. Subsequently, an origination retry count calculation process, an origination process, etc. are performed.

Based on the fourth embodiment mentioned above, since automatic selection of the communication mode corresponding to the communicative function is practicable, this further enhances user-friendliness.

E. Fifth Embodiment

Next, the fifth embodiment of the present invention will be explained.

In the first embodiment described above, the preferred order is previously set as the communication mode and that preferred order is fixed. In this fifth embodiment, the preferred order of the applicable communication mode is modified corresponding to the past communication result (successful or not?).

Figures 11A, 11B:
FIG. 11A is a conceptual diagram showing the communication mode preferred order status before modification in the fifth embodiment of the present invention.
FIG. 11B is a conceptual diagram showing the showing the communication mode preferred order status after modification in the fifth embodiment of the present invention.

FIG. 11A is a conceptual diagram showing the communication mode preferred order status before modification in the fifth embodiment. In the origination communication mode memory portion 405-2 and as seen in FIG. 11A, the beginning of the PREFERRED ORDER is CDMA, TDMA, WIRELESS LAN, . . . is set in descending sequence (highest to lowest priority). Also, each communication mode retains the previous occasion origination retry count n1, n2, n3, . . . . After completion, the communication modes among the origination retry count n1, n2, n3 containing the highest count, namely, relating to favorable (good) radio wave propagation conditions, will cause that communication mode to be modified (reordered) to the upper ranking of the preferred order, etc. FIG. 11B is a conceptual diagram showing the showing the communication mode preferred order status after modification in the fifth embodiment of the present invention. Specifically, as shown in FIG. 11B, when the wireless LAN origination retry count n3 in preferred order "3" constitutes a higher value as compared to the origination retry count n1, n2 for other communication modes, the preferred order of this wireless LAN will be elevated (i.e., n3 becomes the highest priority).

Based on the fifth embodiment described above, because of favorable radio wave conditions in the communication mode n3, namely, the communication mode in which an entering idle state was most easily successful, will be selected first in the next instance of a communication mode switching process. Also, while being able to improve the connection rate corresponding to radio wave conditions, it also becomes possible to control wasteful power consumption by being able to limit the time interval until establishing a connection.

In addition, each embodiment of the present invention mentioned above is exemplification for describing the present invention and not intended to restrict the scope of the invention only to the embodiments. A person skilled in the art could implement the present invention in other various embodiments without deviating from the summary of the present invention.

Therefore, while the present invention has been described with reference to the preferred embodiments, it is intended that the invention be not limited by any of the details of the description therein but includes all the embodiments which fall within the scope of the appended claims.

What is claimed is:

1. A wireless communication terminal comprising:
a communication means for communicating;
a communication status acquisition means for acquiring a communication status by said communication means;

an acquired communication status time measurement means for measuring a time interval required until acquiring the communication status; and an origination retry count attempt calculation means for calculating a maximum number of origination retry count attempts to establish a connection when a failure condition occurs during an origination operation by said communication means based on the time interval measured by said acquired communication status time measurement means, wherein the maximum number is related to the communication status acquired by said communication status acquisition means; and wherein said origination retry count attempt calculation means decreases the maximum number of origination retry count attempts when the time interval until acquiring the communication status is longer than required based on the communication status acquired by said communication status acquisition means.

2. The wireless communication terminal according to claim 1, wherein the communication status is an idle state and wherein the wireless communication terminal further comprises a time measurement means for measuring an entering idle state period until an entering idle state operation is completed by said communication means; and wherein said origination retry count attempt calculation means calculates the maximum number of origination retry count attempts by said communication means based on entering idle state period measured by said time measurement means.

3. The wireless communication terminal according to claim 2, wherein said origination retry count attempt calculation means decreases the maximum number of origination retry count attempts when the entering idle state period measured by said time measurement means is longer.

4. The wireless communication terminal according to claim 3, wherein said origination retry count attempt calculation means calculates the maximum number of origination retry count attempts for communication modes selected within a range of all the maximum number of origination retry count attempts set in advance.

5. A wireless communication terminal which selectively switches a plurality of communication modes used for communication, comprising:

a communication mode memory means for registering a plurality of communication modes;

a communication mode selection means for selecting a communication mode used for communication in a predetermined sequence from among the plurality of communication modes registered in said communication mode memory means;

an entering idle state operation execution means for executing an entering idle state operation in the communication mode selected by said communication mode selection means;

a switching means for switching the communication mode selected by said communication mode selection means in the event of a failure of the entering idle state operation by said entering idle state operation execution means;

a time measurement means for measuring an entering idle state period required until the entering idle state operation in the selected communication mode is completed when the entering idle state operation according to said entering idle state operation execution means is successful;

an origination retry count attempt calculation means for calculating a maximum number of origination retry count attempts of the selected communication mode based on the entering idle state period measured by said time measurement means; and an origination operation execution means for executing origination retries only for the maximum number of origination retry count attempts calculated by said origination retry count attempt calculation means when unable to establish a connection while performing an origination operation using the selected communication model;

wherein said origination retry count attempt calculation means decreases the maximum number of origination retry count attempts when the entering idle state period measured by said time measurement means is longer than required.

6. The wireless communication terminal according to claim 5, wherein said communication mode switching means judges that an entering idle state operation failed when an entering idle state period until completion of an entering idle state operation by said entering idle state operation execution means exceeds a predetermined threshold value.

7. The wireless communication terminal according to claim 5, wherein said origination retry count attempt calculation means determines the maximum number of origination retry count attempts for communication modes selected within a range of all the maximum number of origination retry count attempts set in advance.

8. The wireless communication terminal according to claim 5, further comprising:

a communication mode specification means for specifying a communication mode used for communication from among a plurality of communication modes registered in said communication mode memory means; and said communication mode selection means selects a specified communication mode by said communication mode specification means as a communication mode used for communication.

9. The wireless communication terminal according to claim 5, further comprising:

a function indication means for indicating communication classification; and said communication mode selection means selects a communication mode corresponding to a communication classification by said function indication means as a communication mode used for communication.

10. A communication method for performing communication in a predetermined communication mode comprising the steps of:

acquiring a communication status prior to an origination operation;

measuring a time interval required until acquiring the communication status; calculating, based on the measured time interval, a maximum number of origination retry count attempts to establish a connection; and performing transmission retries only for the maximum number of origination retry count attempts when a connection fails while performing an origination operation;

wherein the maximum number of origination retry counts attempts is decreased when the time interval until acquiring the communication status is longer than required based on said acquired communication status.

11. The communication method according to claim 10, wherein an entering idle state period is measured until an entering idle state operation is completed and the maximum number of origination retry count attempts is calculated based on said measured entering idle state period.

12. The communication method according to claim 11, wherein the maximum number of origination retry count attempts is decreased when the measured entering idle state period is longer than required.

13. The communication method according to claim 12, wherein the maximum number of origination retry count attempts is calculated within a range of all the maximum number of origination retry count attempts set in advance.

14. A communication method for performing communication by selectively switching a plurality of communication modes used for communication, comprising the steps of:

selecting a communication mode used for communication in a predetermined sequence from among the plurality of communication modes;

executing an entering idle state operation in the selected communication mode;

switching the communication mode and executing the entering idle state operation again when the entering idle state operation being executed has failed;

measuring an entering idle state period required until completion of the entering idle state operation in the selected communication mode when the entering idle state operation being executed is successful;

calculating a maximum number of origination retry count attempts of a the selected communication mode based on the measured entering idle state period; and performing origination retries only for the maximum number of origination retry count attempts when a connection fails while performing an origination operation using the selected communication mode;

wherein the maximum number of origination retry count attempts is decreased when the measured entering idle state period is longer than required.

15. The communication method according to claim 14, further comprising judging that the entering idle state operation being executed has failed, and then switching communication modes when the measured entering idle state period exceeds a predetermined threshold value.

16. The communication method according to claim 14, wherein the maximum number of origination retry count attempts is calculated within a range of all the maximum number of origination retry count attempts set in advance.

* * * * *